UNITED STATES PATENT OFFICE.

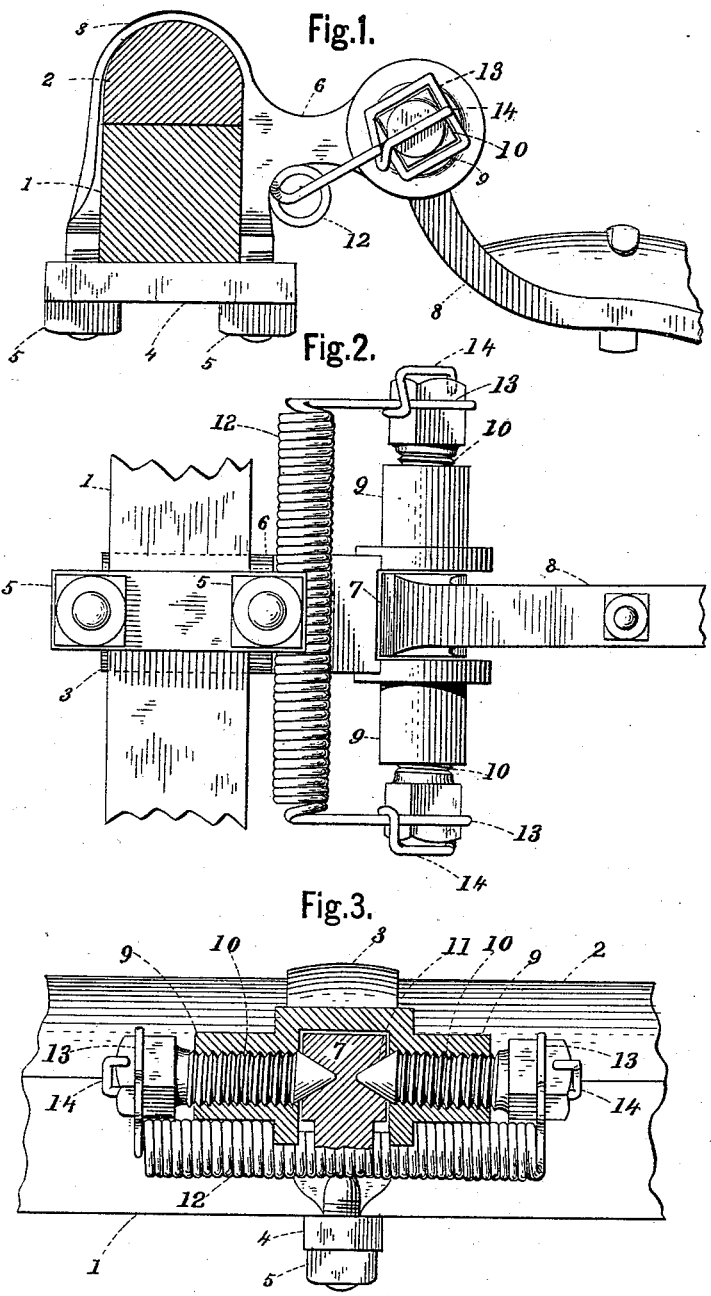

GEORGE W. FORD, OF ELBA, NEW YORK.

THILL-COUPLING.

SPECIFICATION forming part of Letters Patent No. 379,456, dated March 13, 1888.

Application filed September 14, 1887. Serial No. 249,646. (No model.)

*To all whom it may concern:*

Be it known that I, GEORGE W. FORD, a citizen of the United States, residing in Elba, in the county of Genesee and State of New York, have invented certain new and useful Improvements in Thill-Couplings, of which the following is a specification.

My invention relates to certain improvements in thill-couplings in which devices are used for keeping the parts securely in place and for preventing rattling, all of which will be fully and clearly hereinafter described and claimed, reference being had to the accompanying drawings, in which—

Figure 1 is a side elevation, the axle to which the coupling is attached being shown in section. Fig. 2 is a plan or top view. Fig. 3 represents a front elevation partly in section.

Thill-couplings as usually made are liable to get loose and rattle or become uncoupled. The object of my invention is to avoid this objection by the employment of a suitable means to take up the wear and keep a close-fitting joint at all times.

In said drawings, 1 and 2 are portions of an axle and axle-bed, to which the device is represented as attached by the ordinary clip-iron, 3, clip-tie 4, and nuts 5. On one side of the clip-iron is a forward-projecting portion, 6, having a socket into which the head 7 of the thill-iron 8 is fitted. The projecting portion 6 is also provided with side pieces, 9, into which the pointed set-screws 10 are fitted so as to screw in or out easily.

The head of the thill-iron is provided with depressions 11, which correspond in shape to the points of the set-screws, (see Fig. 3,) so that the thill-iron is put into the socket in the projecting portion 6, and then the set-screws are screwed up to their place, as shown in said Fig. 3. A spiral spring, 12, having its two ends bent forward and formed into squares 13, is adapted to pass over the heads of the screws, and with a portion, 14, bent so as to extend over the ends of the heads of the screws, substantially as shown in Figs. 1, 2, 3.

This construction is such that the spring 12 holds the bolt-heads from turning, and, from the fact that the whole body of the spiral 12 is held in place only by reason of the squares 13 being secured to the bolt-heads, is left free to bend in any direction out of a straight line, and also to turn in opposite directions. It thus tends, when the squares 13 are sprung over the heads of the bolts, to turn them slightly in opposite directions and keep them up to their place.

I claim as my invention—

In a thill-coupling, a socketed portion secured to the clip and provided on opposite sides with two pointed set-screws, and a thill-iron adapted to fit the socketed portion and having a depression on each side to receive the points of the set-screws, in combination with a spring having a means for grasping the heads of the set-screws for the purpose of keeping them close up to their place, substantially as described.

GEORGE W. FORD.

Witnesses:
GEORGE H. HOFMANN,
M. NELSON MOULTHROP.